United States Patent [19]

Herald et al.

[11] 4,218,643
[45] Aug. 19, 1980

[54] BRAKING SYSTEM FOR LOADED STEPPING MOTOR

[75] Inventors: Robert F. Herald; Melvin G. Wilson, both of Rochester, Minn.

[73] Assignee: International Business Machines Corporation, Armonk, N.Y.

[21] Appl. No.: 971,579

[22] Filed: Dec. 20, 1978

[51] Int. Cl.² .......................................... G05B 19/40
[52] U.S. Cl. .................................. 318/696; 318/685
[58] Field of Search ................ 318/696, 685, 138, 254

[56] References Cited

U.S. PATENT DOCUMENTS

| | | | |
|---|---|---|---|
| 3,660,746 | 5/1972 | Milek | 318/696 |
| 3,849,714 | 11/1974 | Goreczki et al. | 318/685 |
| 3,967,179 | 6/1976 | Loyzim | 318/696 |
| 4,151,448 | 4/1979 | Azuma | 318/696 X |

Primary Examiner—B. Dobeck
Attorney, Agent, or Firm—Keith T. Bleuer

[57] ABSTRACT

A braking system for an electrical stepping motor having its rotor mechanically connected to drive a transducer carriage of a magnetic disk drive machine, the braking system including a transistor which is responsive to the voltage across the stator coils of the stepping motor and initiates the controlled discharging of a capacitor. The charge on the capacitor is effective through transistor control circuits so as to short all of the stator coils, with the exception of the one to which an energizing voltage is applied for locating the rotor in its target position, when the capacitor discharges in a predetermined time so as to brake the rotor as the rotor approaches its target position on a return movement after the rotor initially passes across its target position.

10 Claims, 9 Drawing Figures

BRAKING SYSTEM FOR LOADED STEPPING MOTOR

BACKGROUND OF THE INVENTION

The invention relates to electrical stepping motors and more particularly to such stepping motors that are connected to drive a transducer carriage in a magnetic disk file machine.

Stepping motors have previously been proposed for driving the transducer carriages in disk drive machines. A series of stator coils are sequentially energized in order to cause the rotor of the stepping motor to move between initial and target positions with corresponding movements of the transducer carriage between corresponding initial and target positions. The final stator coil is energized in order to hold the rotor of the motor and the transducer carriage in target positions; however, a substantial length of time is required thereafter for the rotor of the motor and the carriage to actually stop in target positions due to the rotor and carriage ringing or oscillating about their target positions. This is particularly true when certain mechanical connections are used between the motor rotor and the carriage forming a simple spring-mass system that allows oscillations of the rotor with respect to the carriage and increases the time required for the carriage and motor rotor to actually stop. Such a transducer carriage is commonly slidably disposed on guide rods which allow the carriage to move across the associated magnetic disk with corresponding movement of a transducer carried by the carriage, and it has been proposed that the friction between the carriage and its supporting guiderods be increased in order to reduce the ringing or oscillation of the transducer carriage in the vicinity of its target position. Such increased guide rod friction, however, although causing the carriage to stop in a reduced time, decreases the accuracy with which the transducer carriage may be located with respect to target position.

SUMMARY OF THE INVENTION

It is accordingly an object of the present invention to provide an improved braking system for an electrical stepping motor and particularly such a motor which is mechanically coupled with a transducer carriage in a disk drive machine. It is a more particular object of the invention to provide such a braking system which shorts all of the coils of the stepping motor except the one which has an applied voltage on it for holding the stepping motor rotor in its target position. It is another object of the invention to provide such an improved braking system which is effective a short time after the transducer reverses direction after crossing its target track on the disk so that return motion of the transducer in moving back to its target track is braked.

In a preferred form, the braking system includes a capacitor which is discharged in a controlled manner beginning with the application of voltage to succeeding ones of the stator windings and with the capacitor controlling the braking system so as to apply braking when the capacitor has discharged to a predetermined charge. The braking system under this control of the capacitor shorts all of the windings of the stepping motor except the winding which is energized in order to move and hold the motor rotor in its target position corresponding to target positions of the transducer carriage of a disk file machine mechanically coupled with the motor rotor.

DESCRIPTION OF THE PREFERRED EMBODIMENT

Figure 1:
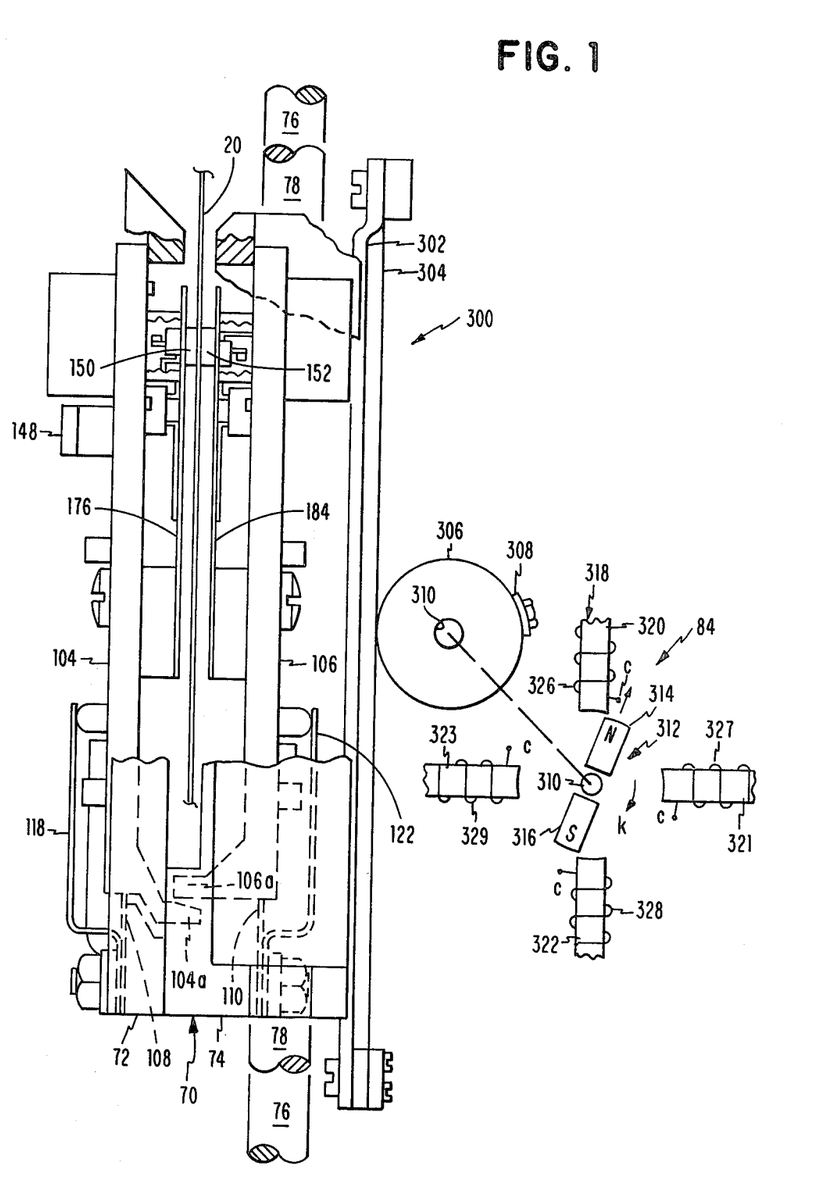
FIG. 1 is an end elevational view of a transducer carriage of a disk drive machine and a schematic illustration of an electrical stepping motor mechanically coupled to the carriage.
Figure 2:
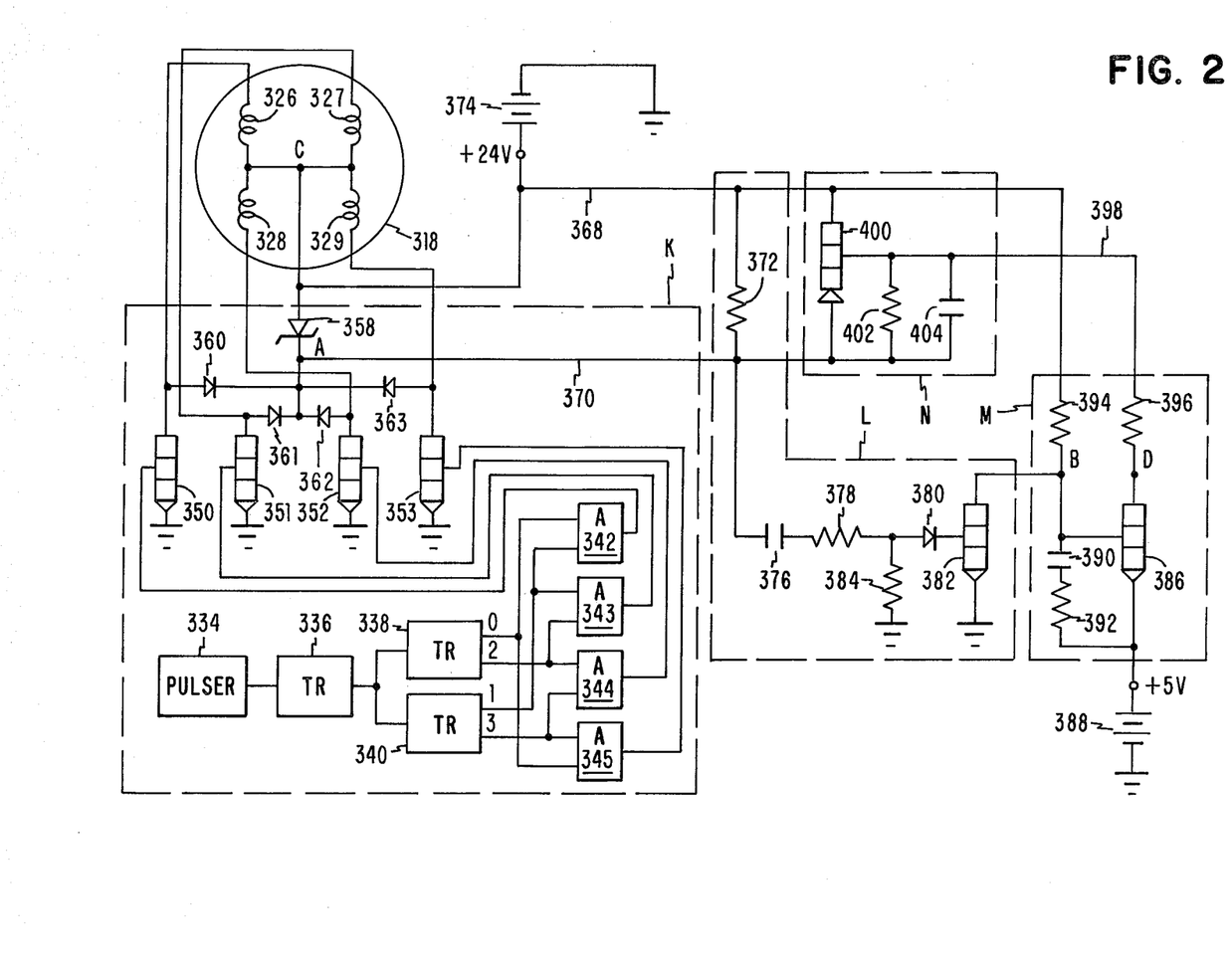
FIG. 2 is a schematic diagram of an electrical circuit for controlling the stepping motor so that the stepping motor is effective to brake the transducer carriage.

The electrical stepping motor control and braking circuitry shown in FIG. 2 hereof is considered useful in connection with many electrical stepping motor applications but is considered particularly useful in connection with an electrical stepping motor which drives parts of a magnetic disk file machine. Such a machine is disclosed in Castrodale, et al. U.S. Pat. No. 4,089,029 issued May 9, 1978; and parts of the disk file machine of this patent and particularly the transducer carriage 70 and its parts are shown in the same forms and use the same reference characters as in said patent. The only differences between the disclosure of said patent and that in FIG. 1 hereof is that the stepping motor 84 is shown schematically in FIG. 1 hereof and a modified drive connection 300 is shown in FIG. 1 hereof connecting the stepping motor 84 with the carriage 70 for reciprocably moving the carriage 70 with respect to a magnetic disk. This U.S. Pat. No. 4,089,029 may be referred to for a disclosure of the details of this disk drive machine.

Referring to FIG. 1 hereof, the carriage 70 may be seen to comprise a pair of carriage parts 72 and 74 that are fixed together. A pair of arms 104 and 106 are swingably disposed on the carriage 70 by means of leaf springs 108 and 110, and a pair of return springs 118 and 122 are provided for swinging the arms 104 and 106 together. A hook 148 is provided on the arm 104 by means of which the arm 104 may be swung outwardly, and the arms 104 and 106 have a pair of coacting portions 104a and 106a for causing the arm 106 to swing outwardly along with the arm 104.

Transducers 150 and 152 are respectively mounted on the swing arms 104 and 106 by means of gimbal springs 176 and 184. The carriage 70, the gimbal springs 176 and 184 and the transducers 150 and 152 embrace a magnetic disk 20, and the carriage 70 is adapted to slide along guide rods 76 and 78 so as to move the transducers 150 and 152 radially of the disk 20 while in contact with the disk.

The drive connection 300 between the stepping motor 84 and the carriage 70 comprises a rigid frame 302 fixed to the carriage 70 and a flexible band 304 having its ends fixed to ends of the frame 302. The band 304 extends around a drive drum 306, and the band 304 is fixed with respect to the drum 306 by any suitable clamp 308. The drum 306 is rotatably mounted by means of a central shaft 310.

The stepping motor 84 as shown in FIG. 1 hereof may be seen to comprise a rotor 312 mounted on the shaft 310 and having a north pole 314 and a south pole 316. The motor 84 also includes the stator 318 formed of cores 320, 321, 322 and 323 disposed at 90 degrees with respect to each other about the shaft 310. Coils 326, 327, 328 and 329 are respectively disposed on the cores 320, 321, 322 and 323.

The stator coils 326–329 are connected together as shown in FIG. 2 at a common center point C. The motor 84 is under the control of a control circuit K shown in FIG. 2 which is conventional. The circuit K includes a pulser 334 driving a trigger 336 which in turn drives triggers 338 and 340. Each of the triggers 338 and 340 has two outputs, and these are connected as shown to AND circuits 342, 343, 344 and 345. The outputs of the AND circuits 342, 343, 344 and 345 are connected to the bases of transistors 350, 351, 352 and 353 respectively. The collectors of the transistors 350, 351, 352 and 353 are respectively connected to the stator coils 329, 326, 327 and 328, as shown. A Zener diode 358 is connected between the point C and a point A; and diodes 360, 361, 362 and 363 are connected between the point A and the collectors of the transistors 350, 351, 352 and 353 respectively.

The braking circuitry for the stepping motor 84 includes a trigger L, a resettable single shot M and a dynamic brake circuit N, all indicated in FIG. 2.

The points C and A are respectively connected to leads 368 and 370. A resistor 372 in trigger L is connected between the leads 368 and 370; and a plus voltage source 374, such as of +24 volts, is connected to the lead 368. The trigger L also comprises a capacitor 376, a resistor 378 and a diode 380 connected in series between the lead 370 and the base of a transistor 382. The trigger L also includes a grounded resistor 384 connected between the resistor 378 and diode 380.

The resettable single shot M includes a transistor 386 having its base connected to the collector of the transistor 382, with a point B being indicated for this connection between the transistors 386 and 382. A plus voltage source 388, which is of less potential than the source 374 and may be +5 volts for example, is connected to the emitter of the transistor 386; and a capacitor 390 and a resistor 392 in series are connected between the point B and the voltage source 388. A resistor 394 is connected between the lead 368 and the point B, and a resistor 396 is connected between a lead 398 and the collector of the transistor 386. The junction between the collector of the transistor 386 and the resistor 396 may be indicated as the point D.

The dynamic brake circuit N includes a transistor 400 having its emitter connected to lead 370, its base connected to lead 398 and its collector connected to lead 368. The circuit N also includes a resistor 402 and a capacitor 404 both connected between the leads 370 and 398.

Figure 3:
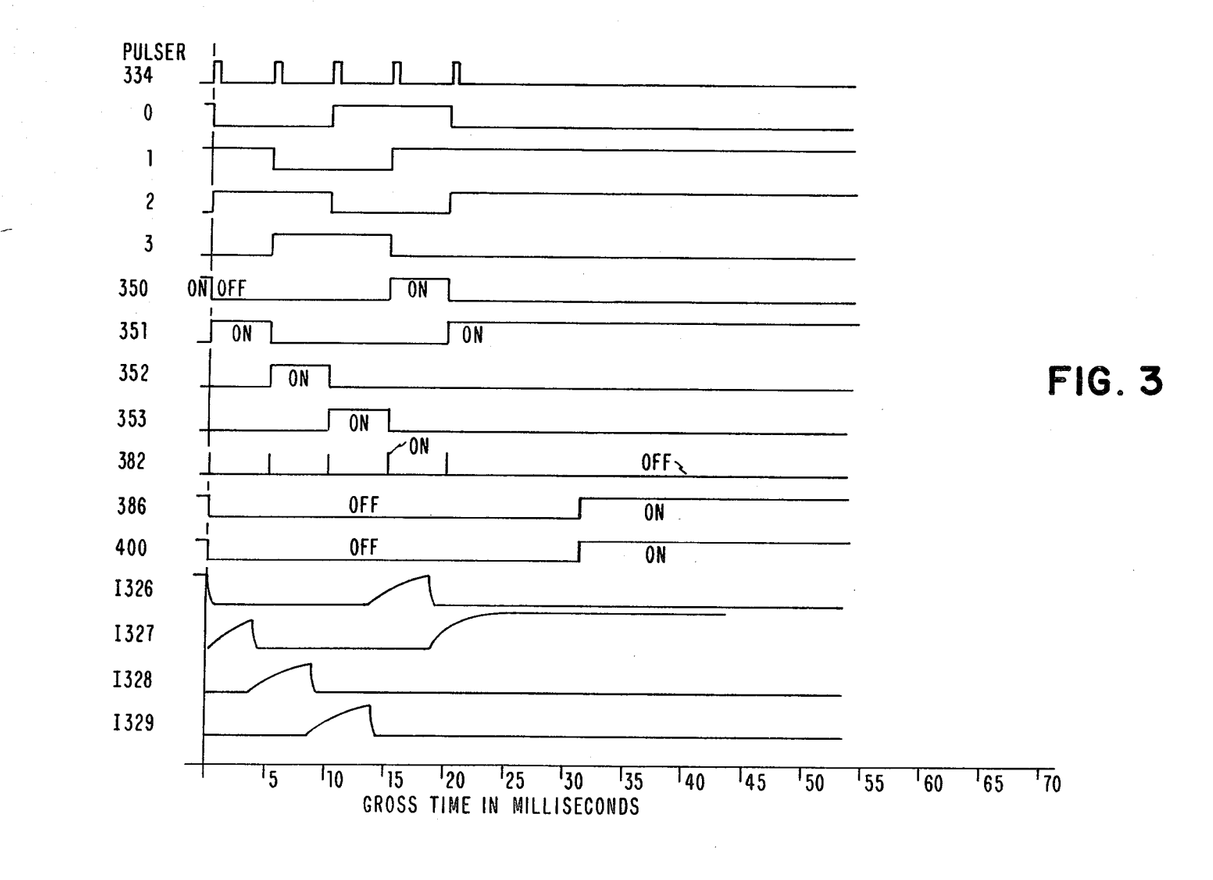
FIG. 3 is a timing diagram showing the comparative conditions of various components of the electrical circuit of FIG. 2.

In operation, the pulser 334 provides pulses spaced timewise at 5 milliseconds apart, for example (see FIG. 3, which shows 5 pulses from pulser 334 corresponding to a 5 step move of armature 312). The triggers 336, 338 and 340 cooperate so that the triggers 338 and 340 provide 0, 1, 2 and 3 outputs which are applied onto AND circuits 342, 343, 344 and 345. The 0, 1, 2 and 3 outputs of the triggers 338 and 340 are shown in FIG. 3; and it will be observed that the 0 and 1 outputs are at 90 degrees with respect to each other and that the 2 and 3 outputs are simply inverses of the 0 and 1 outputs, respectively. The result of the connections between the triggers 338 and 340 and the AND circuits 342–345 is to provide consecutive signals on the transistors 350, 351, 352 and 353 so as to consecutively energize the stator windings 326, 327, 328 and 329 with the currents I326, I327, I328 and I329 (see FIG. 3). For the 5 step move illustrated in FIG. 3, the first and last of these transistors energized is the transistor 351, and the first and last stator coil energized is the stator coil 327. The north pole 314 of the armature 312 is therefore attracted consecutively to the stator cores 321, 322, 323, 320 and 321 so that the rotor 312 rotates in somewhat stepwise motion and velocity in the direction k for the 5 steps. The drum 306 is mechanically connected with the armature 312 through the shaft 310, and the flexible strip 304 is thus wound about the drum 306 in a certain direction so as to cause a corresponding movement of the carriage 70 along the guiderods 76 and 78. The transducers 150 and 152 are thus moved correspondingly radially of the disk 20. It is apparent from FIG. 3 that a rotation of the rotor 312 through 90 degrees, from one of the stator cores 320-323 to the next of the stator coils in the direction k, takes place for each of the pulses applied to the trigger 336 by the pulser 334.

The diodes 360–363 are provided in order to cope with the collapsing flux of the stator coils 326–329 as each of these coils is turned OFF due to a pulse from the pulser 334. When one of the coils 326–329 is turned OFF after being energized from the associated drive transistor 350–353, the collapsing magnetic flux produces a voltage across the coil with the requirement that a corresponding current be allowed to flow through the coil if the associated drive transistor 350–353 is not to be damaged by excessive voltage applied thereto. The current due to the collapsing magnetic flux flows through the associated diode, such as the diode 360 for the stator coil 326 and through the Zener diode 358 which thus in effect shunt the stator coil. The Zener diode 358 is back biased in this case so as to have its designed particular maximum voltage (for example, 24 volts) across it.

Figure 4:
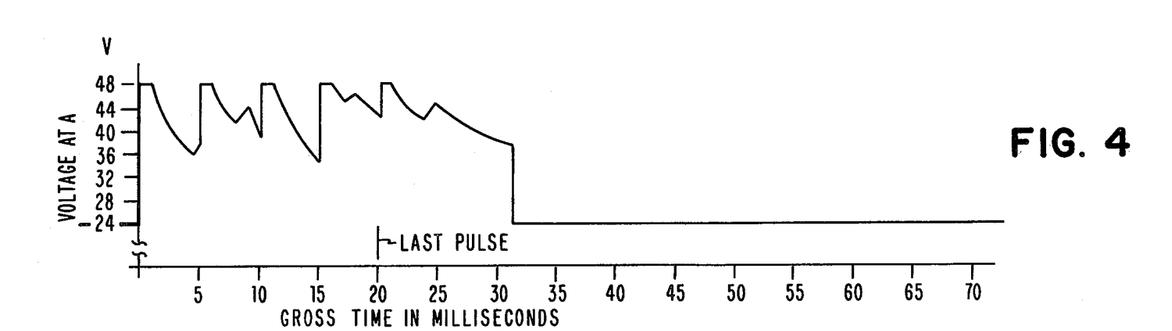
FIGS. 4–7 are graphs showing the elapsed time variations of voltages at various places in the FIG. 2 circuit.

The voltage at the point A on a turn OFF of one of the stator coils 326—329, which occurs on the existence of each of the pulses from pulser 334, is therefore the back biased Zener voltage of 24 volts due to the collapsing magnetic flux of the stator coil just turned OFF plus the voltage of the power supply 374, which may be 24 volts, or 48 volts total. The voltage at the point A is shown in FIG. 4, and it will be understood that the values of voltage, time, displacement, etc. shown in this figure and in FIGS. 3 and 5–9 are exemplary only and may well vary with changes in values of circuit components, etc. It will be observed from FIG. 4 that the Point A voltage rapidly rises to the maximum of 48 volts for each 5 milliseconds and each pulse from pulser 334 and then decreases somewhat gradually. The initial rapid rise of the point A voltage (from 24 volts to 48 volts as shown in FIG. 4 at 0 milliseconds, gross time—beginning with the first pulse from pulser 334) passes through the capacitor 376 and is applied through the resistor 378 and diode 380 to the transistor 382 which thus turns ON for a very short time. The resistors 378 and 384 reduce the amplitude of the voltage passed by the capacitor 376, and the capacitor 376 in particular causes only the rapid rise of the voltage at point A to be effective to turn ON the transistor 382. The ON times for the transistor 382 are shown in FIG. 3 to correspond with the rises of the pulses from pulser 334. The length of time that the transistor 382 is ON is determined by the values of the capacitor 376 and resistors 378 and 384.

The diode 380 is used in conjunction with the transistor 382 since, when the capacitor 376 later discharges, the voltage across the resistor 384 will be reversed. This would undesirably reverse the voltage on the base of transistor 382 if the diode 380 were not in series with the base of transistor 382.

The resistor 372 is used in the trigger L in order to provide a discharge path for the capacitor 376. Assuming that the point A voltage comes up to its maximum of 48 volts to charge the capacitor 376 and then reduces, without the resistor 372 there would be no path for the charge on the capacitor 376 to dissipate; and there could therefore be no subsequent turning ON of transistor 382.

Prior to a first turning ON of the transistor 382, the transistor 386 is ON (see FIG. 3). This is due to the fact that the voltage from the source 374 is applied onto the base of the transistor 386 (through the resistor 394). At this time, the transducer 400 also is ON; and this is due to the control of the transistor 400 by the transistor 386 which will be hereinafter described in greater detail.

Figure 5:
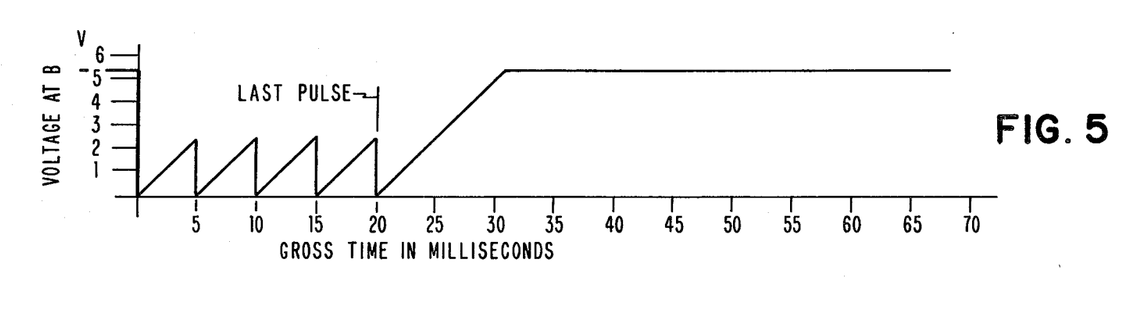
Figure 6:
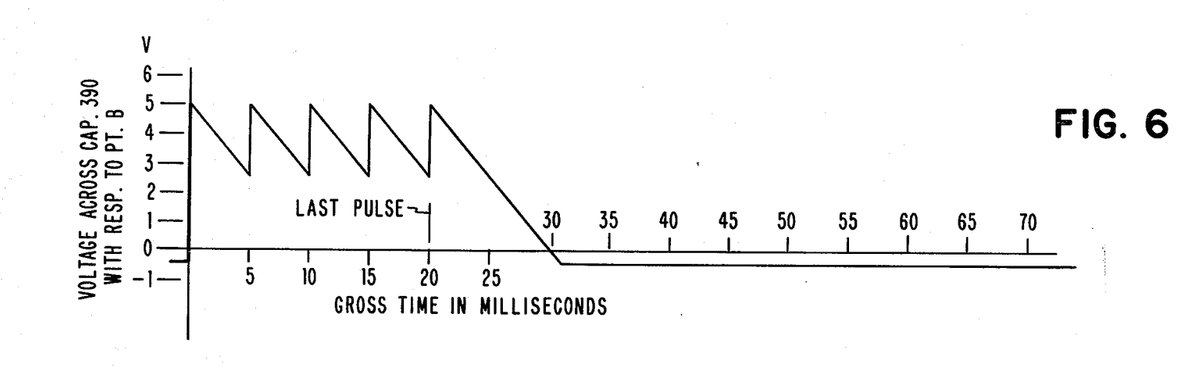

The transistor 382, when turned ON with the initial rapid rise of the point A voltage (shown at 0 milliseconds in FIG. 4), in effect grounds the point B as shown in FIG. 5 so that the capacitor 390 charges from the 5 volt source 388 through the resistor 392 and transistor 382. The capacitor 390 thus charges to the full 5 volts of the source 388 (see FIG. 6), and this occurs very quickly when the previously energized stator coil 326 is turned OFF causing the trigger L to trigger and the capacitor 390 to charge. Since the plus voltage is on the bottom plate of the capacitor 390 as it is illustrated in FIG. 2, the transistor 386 is reverse biased. At this time, therefore, the transistor 386 turns OFF (on the previously enerigized coil 326 turning OFF). The capacitor 390 then starts to discharge from the 24 V voltage source 374 and with current flow through resistors 394 and 392 to voltage source 388. The time constant provided by the resistors 392 and 394 in connection with the capacitor 390 is long, and this discharging of capacitor 390 is slow. As is shown in FIG. 6, the voltage with respect to point B across capacitor 390 decreases to 2.5 volts (with the lower plate of the capacitor 390 as shown in FIG. 2 having a plus charge); and, at this time, the transducer 382 again turns ON for a very brief time with the second pulse from pulser 334. This again grounds the upper plate of capacitor 390 so that the voltage on the capacitor 390 is again raised to its value of 5 volts. The charge of 2.5 volts across capacitor 390 is not sufficient for turning on the transistor 386, and the transistor 386 remains OFF. Likewise, the transistor 400 remains OFF, since the transistor 386 controls the transistor 400 as will be hereinafter described in more detail.

For each of these succeeding pulses from the pulser 334 and for each of the succeeding steps of the rotor (prior to the last pulse from the pulser 334 and last step of the rotor 312), the transistors 386 and 400 remain OFF in the same manner as has just been described in connection with the first pulse from the pulser 334. The voltage at the point B continues to vary between 0 volts and 2.5 volts and the voltage across the capacitor 390 continues to vary between 5 volts and 2.5 volts as shown in FIGS. 5 and 6 for these subsequent steps and for each of the excursions of the point A voltage to 48 volts.

After the last of the 5 pulses from the pulser 334 at 20 milliseconds from start (gross time), the voltage at point A decreases substantially from its 48 volt maximum as may be seen from FIG. 4. This is due to the fact that no further stator coils 326-329 are energized with succeeding deenergizations and magnetic flux disintegrations. Since the transistor 382 only goes ON (and then only for a very short period) on a pulse from the pulser 334 and a rise of the point A voltage to 48 volts, the transistor 382 remains OFF subsequent to the last pulse from the pulser 334. The discharge of the capacitor 390 thus may continue below the 2.5 volts which was the former limit, and the charge on the capacitor 390 reaches its base value of $-\frac{1}{2}$ volt from the 24 volt source as is shown in FIG. 6, for an effective full discharge. The voltage at point B at the same time increases from 0 volts to 5.5 volts as shown in FIG. 5. This full buildup of voltage at point B and the full discharge of capacitor 390 occur substantially at 11 milliseconds after the last pulse from the pulser 334 or at 31 milliseconds from start as indicated in FIGS. 5 and 6 for the particular circuit described.

As soon as the voltage at point B reaches 5.5 volts from the 24 volt source 374, subsequent to the last pulse from the pulser 334, the discharging of the capacitor 390 stops. The 5.5 volt limit at point B is determined by the 5 volts supplied from the source 388 plus a $\frac{1}{2}$ volt base-emitter drop of transistor 386. The capacitor 390 at this time is in effect diode clamped by the transistor 386 with one diode drop above the 5 volts of the source 388. At this time the resistor 394 supplies the base current for the transistor 386 from the source 374, turning ON the transistor 386 (see FIG. 3). The voltage at point A at this time is still slightly somewhat higher than the 24 volts from the source 374, with the excess voltage at point A being supplied by the moving rotor 312 which causes a back EMF in the stator coils 326-329.

Figure 8:
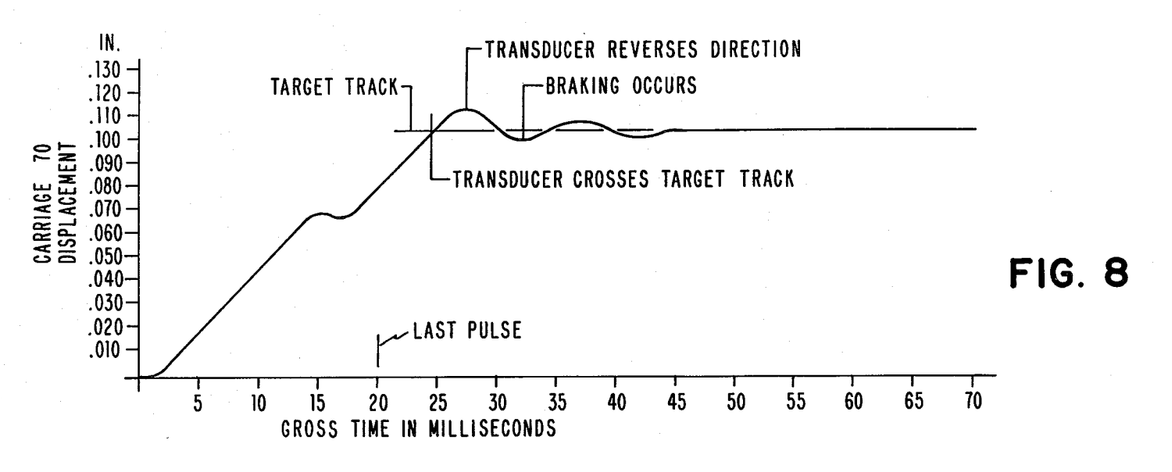
FIGS. 8 and 9 are graphs showing the elapsed time displacements of the carriage with respect to the target track for the transducers carried by the carriage.

As is shown in FIG. 8, during the 11 milliseconds subsequent to the last pulse from pulser 334, the carriage 70 and transducers 150 and 152 have overshot their target positions (with accompanying overshoot by rotor north pole 314 with respect to stator pole 321). For the particular example described, the initial passage of the transducers 150 and 152 across their target tracks takes place about 5 milliseconds subsequent to the last pulse from the pulser 334 as is shown in FIG. 8. After about 8 milliseconds subsequent to the last pulse from the pulser 334, the transducers 150 and 152 and the carriage 70 reverse their directions with a return movement of the rotor 312 toward its target position with respect to the stator core 321. It will be borne in mind that the stator coil 327 remains ON, with the corresponding transistor 351 being ON, so that the north pole 314 is drawn toward its target position in alignment with the stator core 321.

Figure 7:
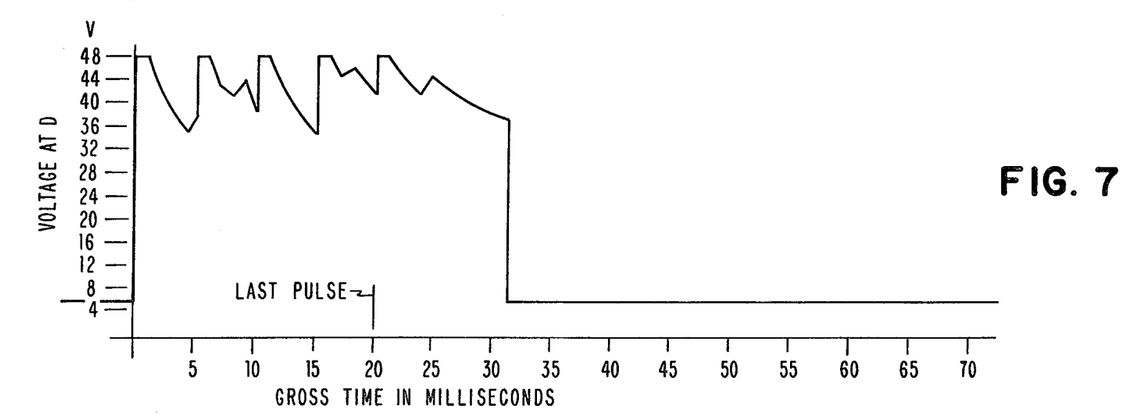

At the end of 11 milliseconds subsequent to the last pulse from the pulser 334, the transistor 386 is turned ON as just described to reduce the voltage at point D as shown in FIG. 7. The resultant current flow through the transistor 386 provides a decreased voltage at the base of transistor 400 transmitted through resistor 396 and lead 398, so that the transistor 400 is also turned ON. The voltage at point A is abruptly decreased to the voltage of 24 volts of the source 374 as shown in FIG. 4, and this is due to the shorting action of the transistor 400. The transistor 400 when turned ON has the function of shorting the Zener diode 358 and directly connecting the points C and A. All of the stator coils exclusive of the stator coil 327, which is that coil tending to move and hold the rotor 312 in its target position, are thus shorted by the transducer 400; and the back EMF produced by motion of the rotor 312 thus generates a current in these shorted windings. The back currents in these 3 windings due to the back EMF in them so energizes their respective cores 320, 322 and 323 as to oppose motion of the rotor 312, and the rotor 312 is thus braked. This braking commences when the transistor 400 is turned on, and this is very shortly subsequent to the time at which the transducers 150 and 152 and the carriage 70 start their return movement back toward the target track of the transducers on the magnetic disk 20 as is shown in FIG. 8.

Figure 9:
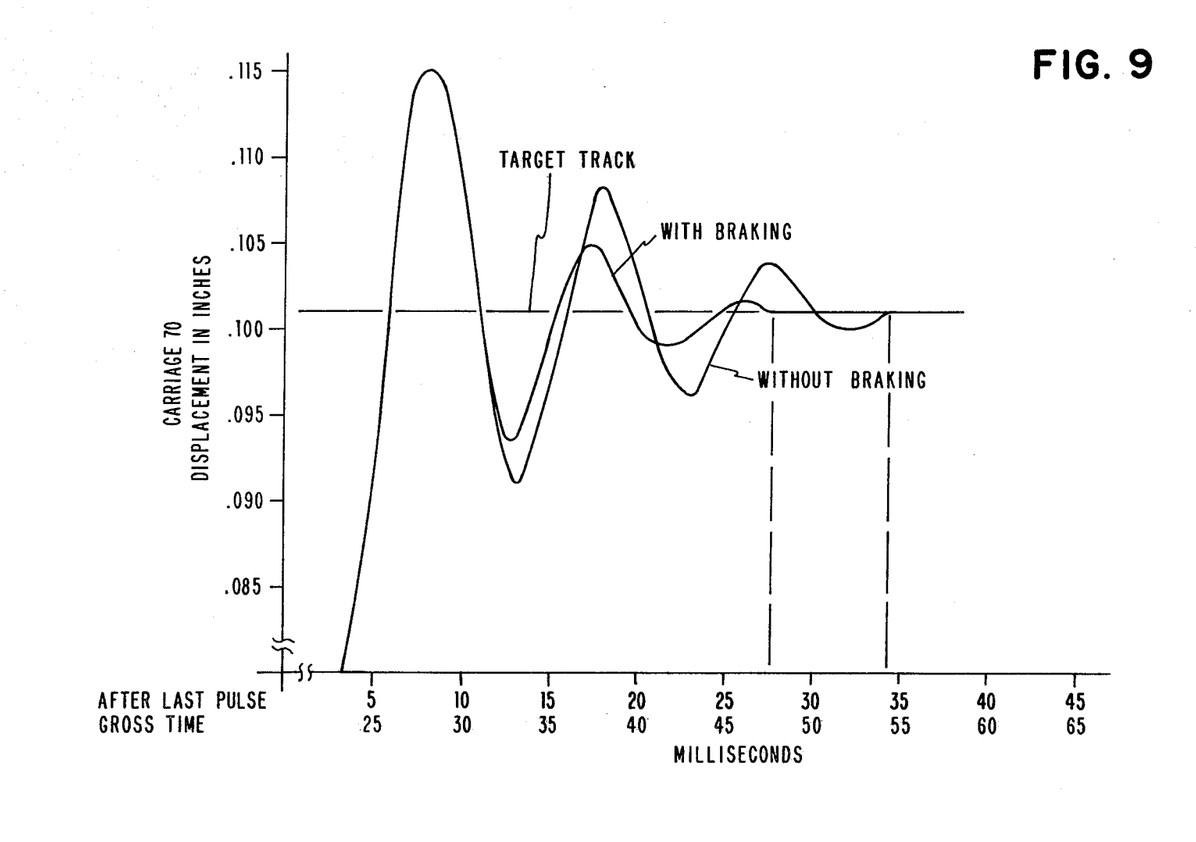

As is shown in FIG. 8, and as is shown in greater detail in FIG. 9, the carriage 70 has some slight oscillations across its target track after the transducer 400 has been turned on to provide the braking action; however, these oscillations are few and of small amplitude. Since the braking action is dependent upon movement of the rotor 312, the braking action ceases when the rotor 312 finally aligns itself and stops in register with its target core 321 for the five step movement of the rotor 312, and the energization of the core 321 holds the rotor in its target position. Likewise, the transducers 150 and 152 and the carriage 70 are held in their target positions.

The purpose of the resistor 396 is to limit the base current coming from transistor 400. When the transistor 386 turns ON, the collector of transistor 386 is at 5.5 volts (see FIG. 7), and the current flow is from the base of transistor 400 to the collector of transistor 386. The current flow in transistor 400 is from the emitter to the base, and this emitter-base current is thus limited by resistor 396.

The resistor 402 between the base and emitter of transistor 400 is conventional and provides a conventional means of draining the charge between the emitter-base junction of the transistor 400.

The capacitor 404 is provided between the base and emitter of transistor 400 in order to assure that the transistor 400 shall be turned OFF immediately as the first step is taken by the rotor 312. The transistor 400 initially is ON as is shown in FIG. 3 and, as has been previously described, the current resulting is through the leads 368 and 398 to the transistor 400 and tends to keep the transistor 400 ON. When a first rotor step is taken, one of the driver transistors 350–353 turns ON and another turns OFF. The current resulting from the de-energized coil passes through lead 370, transducer 400, and lead 368. This would maintain current in the stator coil just turned OFF to undesirably slow motion of the rotor 312. The capacitor 404 in effect prevents an instantaneous change in the base-emitter voltage of transistor 400 and thus maintains the base-emitter voltage of transistor 400. Thus, when the voltage on point A rises with the first pulse from the pulser 334, the point A voltage also raises the voltage at the base of transistor 400, thus turning OFF the base-collector diode of transistor 400. Since the base-emitter diode of the transistor 400 was never turned ON transistor 400 thus turns OFF very rapidly as desired, at the first pulse from the pulser 334.

The distance that the carriage 70 and the transducers 150 and 152 initially move beyond their target positions with the rotor 302 rotating in direction k will depend, of course, on the mass and velocity of the carriage 70. Likewise, the time required for the carriage 70 and transducers 150 and 152 to be brought back into their target positions depends on the mass and velocity of the carriage 70. For an ordinary installation, 30 milliseconds may be required before the carriage 70 is actually back in its target position after the last pulse from the pulser 334.

For the 5 step operation herein described, FIG. 9 illustrates in some detail the oscillations of the carriage 70 about the target track for the transducers 150 and 152, with the carriage 70 being in final rest position in about 47.5 milliseconds after start (gross time) or about 27.5 milliseconds after the last pulse from the pulser 334. The oscillations of the carriage 70 and rotor 312 have been found to have a beneficial effect in accurately locating the carriage 70 and transducers in their final positions so that the braking effect by the transducer 400 has been made to be effective subsequent to the passage of the transducers initially across their target tracks on the disk 20 and more particularly after the transducers have reversed their directions as is shown in FIG. 8. The braking system herein described is particularly suitable for use with the carriage drive 300 which includes the flexible strip 304 which has some resilience and which constitutes a part of a spring-mass system that also includes the carriage 70. The oscillations of the carriage 70 are particularly held limited in amplitude and duration due to the resilient effect of the strip 304, and the springiness of the strip 304 assures sufficient final oscillation of the carriage 70 for accurately locating it in final position.

FIG. 9 also illustrates the advantages of the braking system disclosed herein in comparison with a system not having such braking. With the braking action of the transistor 400, the oscillations of the carriage 70 die out about 47.5 milliseconds after start (about 27.5 milliseconds after the final pulse), while without such braking action and with the transistor 400 being deactivated, it requires about 54.5 milliseconds (34.5 milliseconds after the last pulse) for the carriage 70 to come to rest.

Although the motor 84 has been disclosed herein to have only the 4 stator poles 320–323, the motor controlled by the circuitry herein disclosed may well have many more poles, such as 200 stator poles. The associated rotor, instead of rotating through 90 mechanical degrees at each step, in this case will rotate through 1.8 mechanical degrees which are equivalent to 90 electrical degrees and to the 90 mechanical degrees of the stator poles 320–323 shown in FIG. 1. Although a 5 step rotor move (with 5 pulses from the pulser 334) has been described, the braking circuitry obviously works in the same manner for a rotor move of any number of steps.

We claim:

1. Control apparatus for a stepping motor which has a plurality of energizable stator coils for advancing the rotor of the stepping motor in response to the sequential energization of the stator coils, said control apparatus comprising:
   means for providing a series of pulses at predetermined time intervals apart,
   circuit means responsive to said pulses for sequentially energizing the stator coils at said predetermined time intervals,
   means for measuring a final time interval subsequent to the last one of said pulses which is greater than said predetermined time intervals, and
   means under the control of said time measuring means for shorting at least one of said stator coils at the expiration of said final time interval so that the induced voltage in said shorted coil creates a current through this coil braking rotor motion at this time.

2. Control apparatus as set forth in claim 1, said time measuring means including a capacitor the charge on which is gradually changed during said final time interval, said means under the control of said time measuring means being responsive to a change of charge on said capacitor for shorting at least one of said stator coils.

3. Control apparatus as set forth in claim 1, said time measuring means including a capacitor, means for charging said capacitor under the control of each of said pulses and circuit means allowing said capacitor to gradually discharge subsequent to each of said pulses, said means under the control of said time measuring means being under the control of said capacitor and the charge thereon for shorting at least one of said stator coils when the charge on said capacitor has decreased to a predetermined low charge.

4. Control apparatus as set forth in claim 1, said time measuring means including a capacitor, a voltage source, means under the control of said pulses for connecting said voltage source with said capacitor on the existence of each of said pulses and allowing said capacitor to discharge between said pulses, said means under the control of said time measuring means including a voltage responsive device responsive to the voltage on said capacitor for shorting said one stator coil when the voltage across said capacitor decreases on its discharge to a predetermined low voltage.

5. Control apparatus as set forth in claim 1, said time measuring means including a capacitor, a source of voltage, a transistor responsive to the voltage at the center of said stator coils so as to in effect apply said voltage of said source on said capacitor at the existence of said pulses so as to charge the capacitor whereby the capacitor decreases in charge and in voltage across the capacitor between said pulses, said means under the control of said time measuring means including a transistor responsive to the voltage across said capacitor and shorting said one stator coil on the decrease of charge and voltage on the capacitor to predetermined low levels.

6. Control apparatus as set forth in claim 5, said means under control of said time measuring means further including a third transistor under the control of said second named transistor so as to short said one stator coil when said second named transistor is effective.

7. Control apparatus for a stepping motor which has a plurality of energizable stator coils for advancing the rotor of the stepping motor in response to the sequential energization of the stator coils, said control apparatus comprising:
means for priviting a series of pulses at predetermined time intervals apart,
circuit means for sequentially energizing the stator coils in accordance with the existence of said pulses and allowing the last one of the stator coils to remain energized after the last one of said pulses,
means for measuring a final time interval subsequent to the last one of said pulses which is greater than said predetermined time intervals and which terminates after said rotor initially moves across its target position in alignment with said energized stator coil and after said rotor reverses its direction of movement in returning toward its target position in alignment with said energized stator coil, and
means under control of said time measuring means for shorting at least one of said stator coils at the expiration of said measured final time interval so that the induced voltage in said last named stator coil creates a current through it braking rotor motion at this time.

8. Control apparatus as set forth in claim 7, said means for measuring including a capacitor, a source of voltage, and switching means under the control of the voltage at the center of said stator coils so as to charge said capacitor on the existence of each of said pulses whereby the charge on the capacitor dissipates between said pulses and whereby the charge on and voltage across the capacitor constitutes a measurement of time after the last such pulse, said means under the control of said time measuring means including switching means under the control of the voltage across said capacitor for shorting said one stator coil when the charge on said capacitor and the voltage across it decreases to predetermined levels.

9. Mechanism for moving and controlling a transducer carriage in a magnetic disk drive, comprising:
an electrical stepping motor having a stator and rotor,
means for mechanically connecting said rotor with said carriage and including a flexible band connected at its opposite ends to parts of said carriage, and a drum driven by said rotor and having said band extending around it.
means for providing a series of pulses spaced at predetermined time intervals apart,
circuit means for sequentially energizing the coils of said stator in accordance with the existence of said pulses and arranged so that the stator coil energized on the last one of said pulses remains energized,
means for measuring a final time interval subsequent to the last one of said pulses which is greater than said predetermined time intervals and which terminates after said stator and said carriage initially move across their target positions with said rotor in alignment with said energized coil and after said rotor and carriage reverse direction with said rotor moving toward its target position in alignment with said energized coil, and
means under the control of said time measuring means for shorting at least one of said stator coils at the expiration of said measured final time interval so that the induced voltage in said last named stator coil creasates a current through it for rotor braking action which thus occurs subsequent to a reversal of motion of said carriage and said rotor.

10. The combination as set forth in claim 9,
said time measuring means including a capacitor, a source of voltage, and switching means under the control of said pulses whereby said capacitor is charged from said voltage source on the existence of each of said pulses and whereby the charge on the capacitor and the voltage across it dissipate between said pulses and subsequent to the last one of said pulses,
said means under the control of said time measuring means including switching means responsive to the charge on said capacitor and the voltage across the capacitor for shorting said one stator coil when the charge on the capacitor and the voltage across it decrease to predetermined levels.

* * * * *